(12) United States Patent
Carne

(10) Patent No.: US 6,899,211 B2
(45) Date of Patent: May 31, 2005

(54) PINLESS ACCUMULATOR PISTON

(75) Inventor: Gary S. Carne, Salt Lake City, UT (US)

(73) Assignee: Sonnax Industries, Inc., Bellows Falls, VT (US)

( * ) Notice: Subject to any disclaimer, the term of this patent is extended or adjusted under 35 U.S.C. 154(b) by 211 days.

(21) Appl. No.: 10/371,637

(22) Filed: Feb. 21, 2003

(65) Prior Publication Data

US 2005/0034953 A1 Feb. 17, 2005

Related U.S. Application Data

(60) Provisional application No. 60/359,476, filed on Feb. 26, 2002.

(51) Int. Cl.[7] ............................................... F16L 55/04
(52) U.S. Cl. .................................. 192/85 R; 192/109 F; 138/31
(58) Field of Search .......................... 192/85 R, 109 F; 138/31; 277/435, 449; 92/242

(56) References Cited

U.S. PATENT DOCUMENTS

| | | | |
|---|---|---|---|
| 3,847,179 A | * 11/1974 | Shellman | 137/596 |
| 3,985,063 A | 10/1976 | Lemon | 91/31 |
| 4,046,162 A | 9/1977 | Rodeghiero | 137/489 |
| 4,601,233 A | 7/1986 | Sugano | 92/52 |
| 4,867,294 A | 9/1989 | de Tuesta | 192/109 |
| 5,025,823 A | 6/1991 | Stevenson | 137/110 |
| 6,203,117 B1 | * 3/2001 | Starr et al. | 303/87 |
| 6,360,778 B1 | * 3/2002 | Vennemeyer et al. | 138/31 |
| 6,390,133 B1 | * 5/2002 | Patterson et al. | 138/31 |
| 6,609,454 B2 | * 8/2003 | Frost | 92/212 |
| 6,612,339 B1 | * 9/2003 | Wilke et al. | 138/31 |

* cited by examiner

Primary Examiner—Saul Rodriguez
(74) Attorney, Agent, or Firm—Clifford F. Rey

(57) ABSTRACT

A replacement accumulator piston for various General Motors transmissions, which absorbs clutch apply fluid pressure to cushion the application of a clutch band against fluid shock is disclosed. The present pinless accumulator piston design eliminates the accumulator pin whereon the original equipment accumulator piston resides thereby resolving the problem of hydraulic leakage at the accumulator pin/piston interface. The elimination of the accumulator pin is accomplished by increasing the axial length of the piston sidewall or skirt, which permits the use of additional guide rings about circumference of the piston. The additional guide rings facilitate the reciprocating movement of the piston within the piston bore in the absence of the accumulator pin and also serve to maintain the hydraulic integrity of the accumulator. The pinless accumulator piston is a direct replacement for both the forward clutch accumulator, and the 1–2 gear and 3–4 gear accumulators in General Motors transmissions.

18 Claims, 6 Drawing Sheets

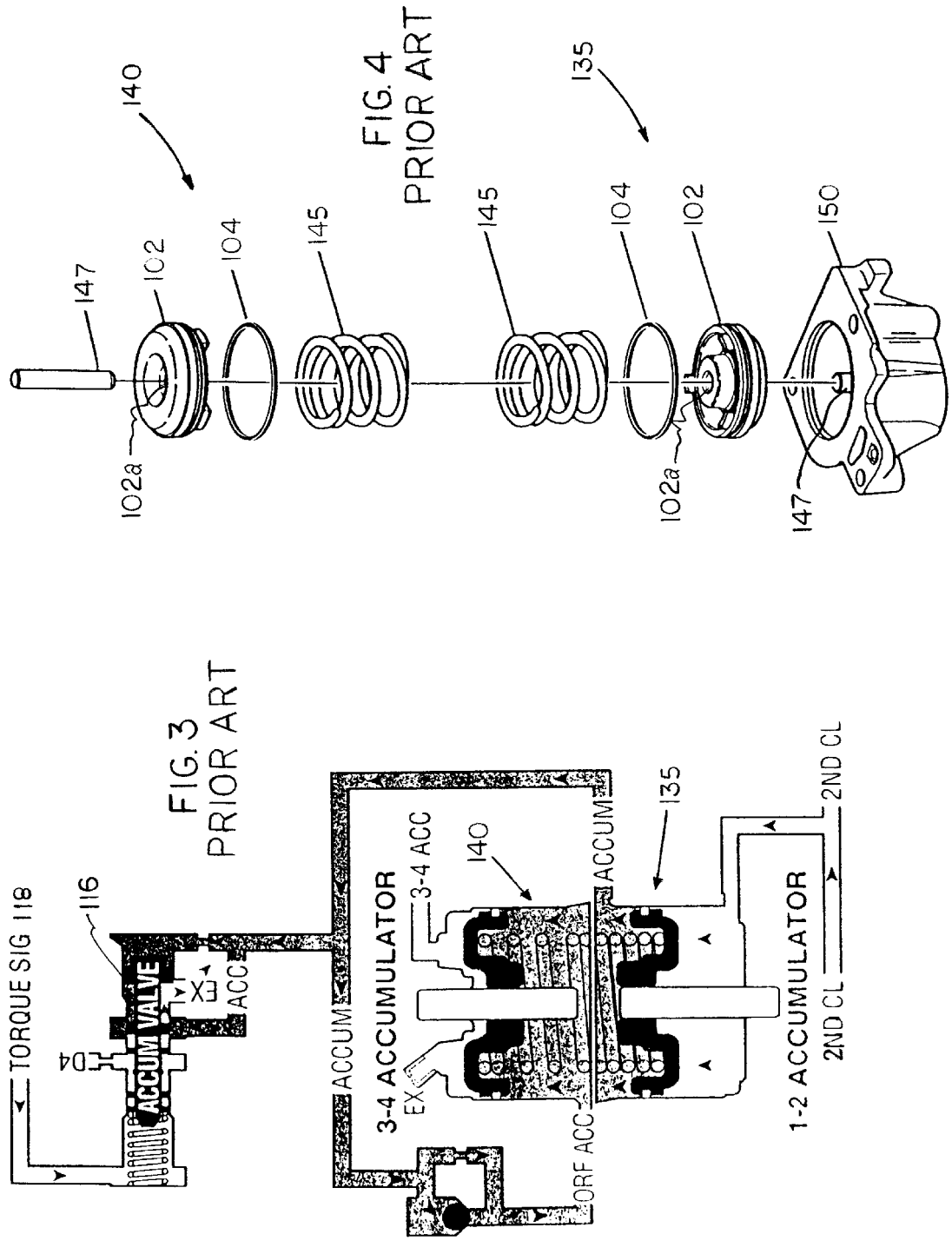

PINLESS ACCUMULATOR PISTON

CROSS-REFERENCE TO RELATED APPLICATION

This application claims the benefit under 35 U.S.C. 119(e) of U.S. Provisional Patent Application No. 60/359,476 filed Feb. 26, 2002, entitled Improved Accumulator Piston.

BACKGROUND OF THE INVENTION

The present invention relates generally to the field of automatic transmission systems and, more particularly, to a pinless accumulator piston for use in General Motors 4L60, 4T60, 4T60E, 4L60E and 4L80E transmissions (hereinafter "GM transmissions").

Automatic transmission systems of the prior art have a hydraulic circuit subsystem which includes at least a hydraulic pump, a valve body having fluid conducting passages or circuits, input and exhaust ports formed within the fluid circuits, and a plurality of valves comprised of generally cylindrical pistons having control diameters or lands formed thereon, which alternately open and close the ports to the fluid circuits to regulate the flow and pressure of automatic transmission fluid (hereinafter "ATF").

Once released into a specific fluid circuit, the pressurized ATF functions to actuate hydraulic clutches, servo pistons, and other components of the transmission. It will be understood that in describing hydraulic circuits, ATF usually changes names when it passes through an orifice or control valve in a specific fluid circuit.

In the GM transmissions accumulators are used to control shift feel during hydraulic clutch application. An accumulator is a spring-loaded device that absorbs a certain amount of apply fluid pressure to cushion the application of a clutch or band against fluid shock. The apply fluid pressure is directed to an accumulator piston that opposes a spring force in the manner of a shock absorber.

In the original equipment manufacture (hereinafter "OEM") of the GM transmissions, an aluminum accumulator piston typically reciprocates against spring pressure on a cylindrical steel accumulator pin, which eventually causes wear at the accumulator pin/piston interface. Such wear causes hydraulic leakage at the accumulator pin/piston interface resulting in poor shift quality and damaged clutches and bands.

Although accumulator pistons without such an accumulator pin are known, such prior art accumulator pistons invariably have an axial length, which exceeds the piston diameter or in some cases have a stepped design for engaging multiple bores in the valve body and, thus, are stable in operation and do not require a center pin to support their axial movement.

There are several known prior art patents that are available in the field and their discussion follows. One example of a prior art accumulator piston is disclosed in U.S. Pat. No. 4,601,233 to Sugano, which teaches a hydraulic servo device with a built-in accumulator used to dampen a rise in hydraulic fluid pressure. This patent shows an accumulator piston 14, which is fit into the inner diameter portion 16 of a servo piston 12. The servo piston 12 is connected to a central stem 18, which guides the axial travel of the accumulator piston 14.

Another example is shown in U.S. Pat. No. 4,867,294 to de Tuesta, which discloses a stepped accumulator piston 24 that engages two separate cylindrical bores 20, 22 to stabilize axial travel of the piston (FIG. 1).

Another example of an accumulator device is disclosed in U.S. Pat. No. 3,985,063 to Lemon, which teaches an accumulator structure for use in a hydraulic control system for controlling a hydraulic motor. This accumulator piston 50 (FIG. 1) engages multiple bores 56, 58 to stabilize axial travel of the piston and also has an axial length, which exceeds its diameter.

U.S. Pat. No. 5,025,823 to Stevenson and U.S. Pat. No. 4,046,162 to Rodeghiero also disclose accumulator pistons having axial length to diameter ratios, which are not practical for the present application.

Thus, the present invention provides a pinless accumulator piston having an axial length, which is substantially less than the piston diameter as is required in the GM transmission applications and which is stable in operation.

SUMMARY OF THE INVENTION

Accordingly, the present invention is a replacement pinless accumulator piston for the GM transmissions having an axial length substantially less than the piston diameter and which eliminates the accumulator pin thereby resolving the problem of hydraulic leakage at the accumulator pin/piston interface. This modification is facilitated by providing additional seals and/or guide rings about circumference of the piston. The additional seals and/or guide rings guide the reciprocating movement of the piston within the piston bore in the absence of the accumulator pin and serve to maintain the hydraulic integrity of the accumulator.

The present pinless accumulator piston is a direct replacement for both the forward clutch accumulator, and the 1–2 and 3–4 accumulators in the aforementioned GM transmissions. In addition, the pinless accumulator piston may be fabricated from alternative materials such as steel bar stock, cast aluminum and engineering grade resins such as phenolic resin to reduce manufacturing costs.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

FIG. 3 is a schematic representation of 1–2 accumulator, the 3–4 accumulator, and the accumulator valve with its associated hydraulic circuits labeled Prior Art;

FIG. 4 is an exploded perspective view showing the components of the 1–2 accumulator and the 3–4 accumulator labeled Prior Art;

DETAILED DESCRIPTION OF THE PREFERRED EMBODIMENTS

Prior to describing the present invention in detail it may be beneficial to briefly review the structure and function of the accumulator assemblies of the prior art GM transmissions. It will be understood that a plurality of such accumulator assemblies are typically utilized within a particular transmission and may be integrated into the transmission valve body, mechanically attached to the valve body, or integrated into the transmission case as described hereinafter.

Figure 1:
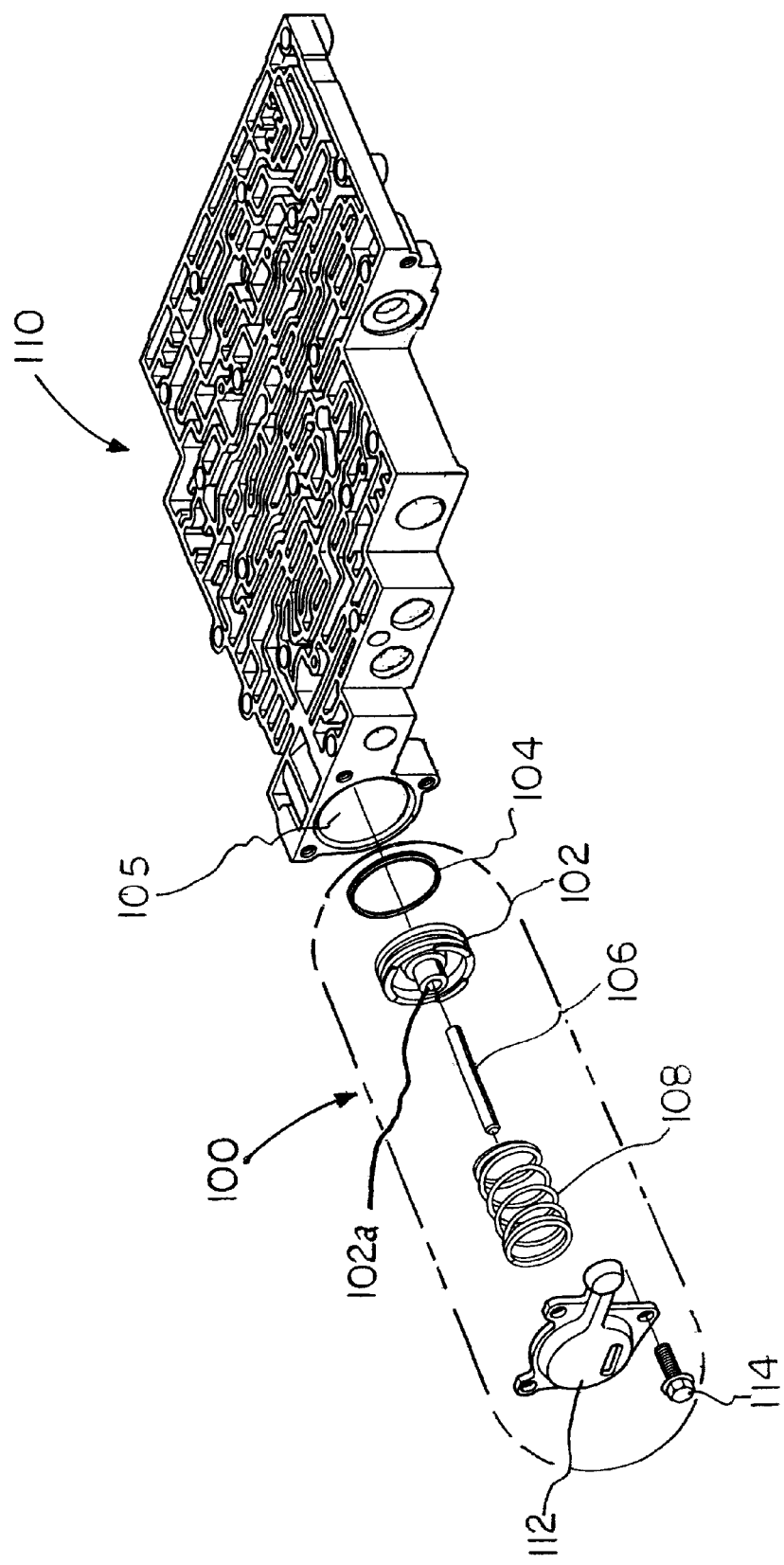
FIG. 1 is a perspective view of an OEM accumulator piston assembly of the Prior Art shown in exploded view and removed from its functional position within the valve body of a GM 4L60E transmission.

With reference to the drawings there is shown therein a forward clutch accumulator assembly of the GM 4L60E transmission, indicated generally at 100, in accordance with the prior art and illustrated in FIG. 1. The forward clutch accumulator assembly 100 (enclosed within broken line) is shown in exploded view and removed from its functional position within the piston bore 105, which is machined into the valve body, indicated generally at 110, as shown.

In the prior art the forward clutch accumulator assembly 100 comprises an accumulator piston 102 having a central bore 102a, a piston seal 104, an accumulator pin 106 pressed into the valve body 110, and a compression spring 108, which are arranged coaxially within the piston bore 105 and secured in position by an accumulator cover 112 using machine bolts 114.

Figure 2:
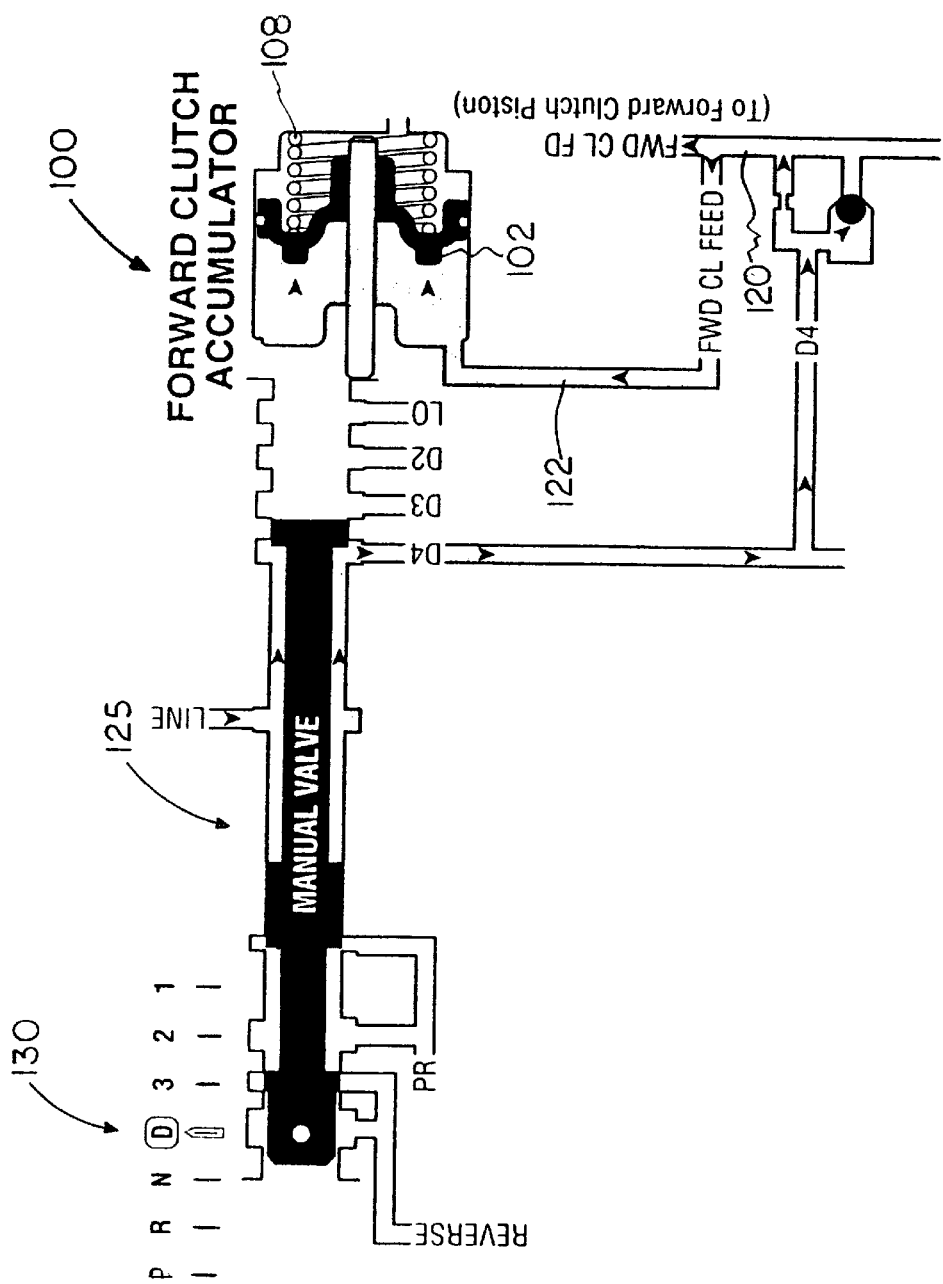
FIG. 2 is a schematic representation of the forward clutch accumulator and its associated hydraulic circuits labeled Prior Art.

In operation the forward clutch accumulator assembly 100 of the GM 4L60E transmission controls shift feel into the forward drive range from Park, Reverse or Neutral. Referring to FIG. 2 forward clutch feed fluid pressure (FWD CL FD) as at 120 applies the forward clutch whenever the manual valve, indicated generally at 125, is shifted into a forward gear range using the gear selector, indicated generally at 130. Simultaneously, forward clutch feed fluid pressure as at 122 is routed to the forward clutch accumulator piston 102. Forward clutch feed fluid pressure at 122 moves the accumulator piston 102 against the force of spring 108 as the clutch begins to apply. This action absorbs some of the initial increase of clutch apply fluid force to cushion the forward clutch apply.

Referring to FIG. 3 the 1–2 gear accumulator assembly, indicated generally at 135, and the 3–4 gear accumulator assembly, indicated generally at 140, help to cushion the application of the 2–4 gear clutch band. These assemblies 135, 140 use accumulator fluid pressure to assist spring force. Accumulator fluid pressure is regulated by the accumulator valve 116 in relation to torque signal fluid pressure as at 118. The Pressure Control Solenoid (PCS) (not shown) regulates torque signal fluid pressure in relation to engine torque, throttle position, and other vehicle operating conditions.

The 1–2 gear accumulator assembly 135 is used to control the apply feed of the 24 gear clutch band in $2^{nd}$ gear. The prior art 1–2 gear accumulator assembly 135 is mechanically attached to the valve body 110 and is comprised of an accumulator piston 102, a piston seal 104, spring 145, and an accumulator pin 147, which is pressed into cover 150.

During a 1–2 gear upshift as illustrated in FIG. 3, clutch fluid is routed to both the $2^{nd}$ clutch servo and the 1–2 gear accumulator assembly 135. The rapid build up of fluid pressure in the $2^{nd}$ gear clutch fluid circuit strokes the accumulator piston 102 against the force of spring 145 and accumulator fluid pressure. This action absorbs some of the initial buildup of $2^{nd}$ clutch fluid pressure and provides a time delay to cushion the 2–4 gear clutch band apply.

The prior art 3–4 gear accumulator assembly 140 also comprises an accumulator piston 102 having a central bore 102a, a piston seal 104, a spring 145, and piston pin 147 (FIG. 4) pressed into the transmission case (not shown). The 3–4 gear accumulator assembly 140 is the primary device for controlling the apply feel of the 2–4 gear clutch band in $4^{th}$ gear. The 3–4 gear accumulator assembly 140 functions in a manner similar to the 1–2 gear accumulator assembly 135. During the 3–4 gear upshift, the 3–4 gear accumulator absorbs the initial increase of the 3–4 gear accumulator fluid pressure to control the apply rate of the 2–4 gear clutch band.

An inherent problem in the OEM design of the prior art accumulator assemblies 100, 135, and 140 is that the accumulator pistons 102 reciprocate against spring pressure on steel accumulator pins 106 and 147 extending through the bore 102a formed in the piston web, which causes wear at the pin/piston interface. This inherent mechanical wear problem causes leakage of clutch fluid pressure resulting in poor shift quality and damaged clutches and bands. As wear at the pin/piston interface becomes more severe, the pistons 102 can be deflected or cocked out of perpendicular to the pins 106, 147 scoring the piston bores and eventually causing seizing of the pistons 102 therein.

Figure 5A:
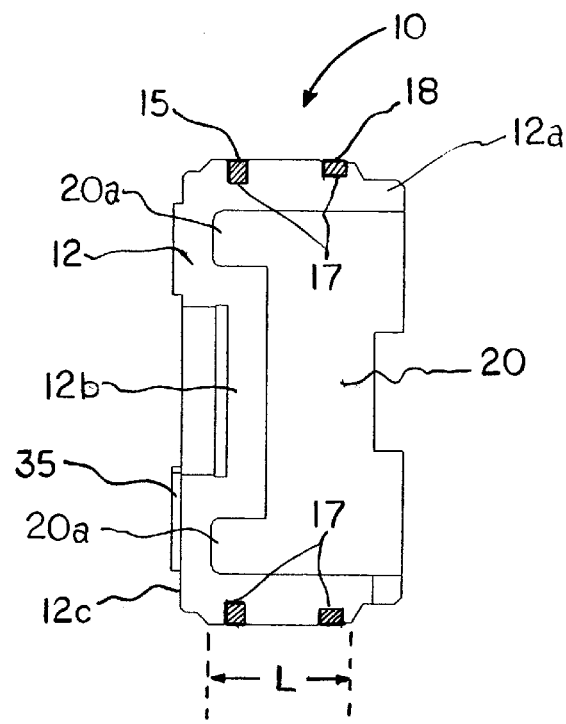
FIG. 5A is a cross-sectional view of the pinless accumulator piston of the present invention.
Figure 5B:
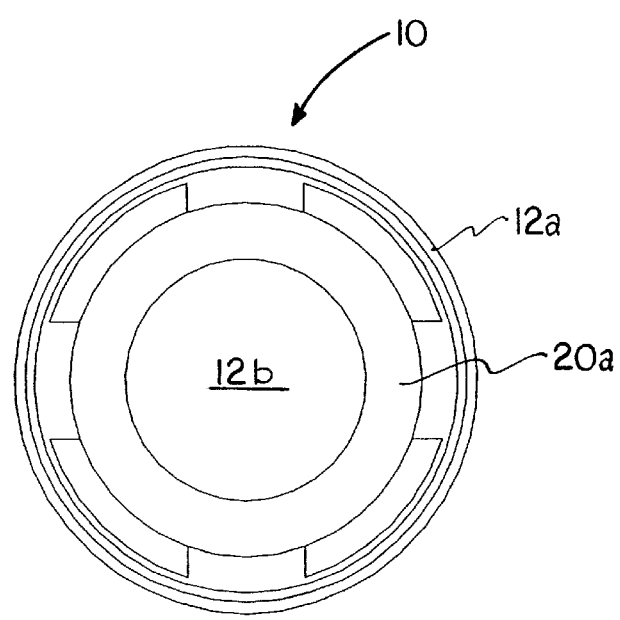
FIG. 5B is an end view of the pinless accumulator piston.

Referring to FIG. 5A there is shown a pinless accumulator piston in accordance with the present invention, indicated generally at 10. It can be seen that the modified structure of the present piston 10 eliminates the OEM pins 106, 147, bore 102a, and, consequently, the pin/piston interface, which is the primary source of clutch fluid pressure leakage in the OEM accumulator design. Because the accumulator pin 106 in the OEM forward clutch accumulator 100 and the accumulator pins 147 in the 1–2 gear and 3–4 gear accumulators are deleted from the present accumulator assembly, the central bore 102a found in the OEM piston 102 is also omitted from the structure of the present piston 10 providing a solid web structure as at 12b in the present design.

This design change is accomplished in the present invention by providing an accumulator piston 10 comprised of a body member 12 including a sidewall or piston skirt 12a, which has a slightly increased axial length as at dimension "L" (FIG. 5A) for contact within the bore 105 in comparison to the OEM piston 100.

The piston skirt 12a is radially disposed about a central recess 20 including a spring groove 20a formed therein at one end thereof, which provides a seating surface for compression spring 145 when assembled.

The present accumulator piston 10 also provides structures comprising piston guiding means including, but not limited to, the following structures. The increased axial length of the skirt 12a permits the installation of at least one additional seal ring or guide ring 18 on the piston skirt 12a to guide the reciprocating, axial movement of the piston 10 within the piston bore 105 in the valve body 110 and/or the transmission case in the absence of the accumulator pins 106 and 147.

As shown in FIG. 5A, the accumulator piston 10 is provided with at least two seal rings 15 or, in the alternative, guide rings 18, or a combination thereof, which reside in parallel grooves 17 formed about the periphery of the piston skirt 12a. Both seal rings 15 and guide rings 18 are fabricated from materials such as Teflon, fluorocarbon rubber, or other materials suitable for this purpose and are provided in various cross-sectional configurations such as lip seals, D-rings, O-rings or combinations thereof for specific applications. In addition to guiding the reciprocating movement of the pistons 12 in lieu of a pin 106, 147 to ensure accurate operation during clutch apply, the seal rings 15 and guide rings 18 function to maintain the hydraulic integrity of the pinless accumulator assembly 10 in order to cushion the application of its corresponding clutch.

Figure 5C:
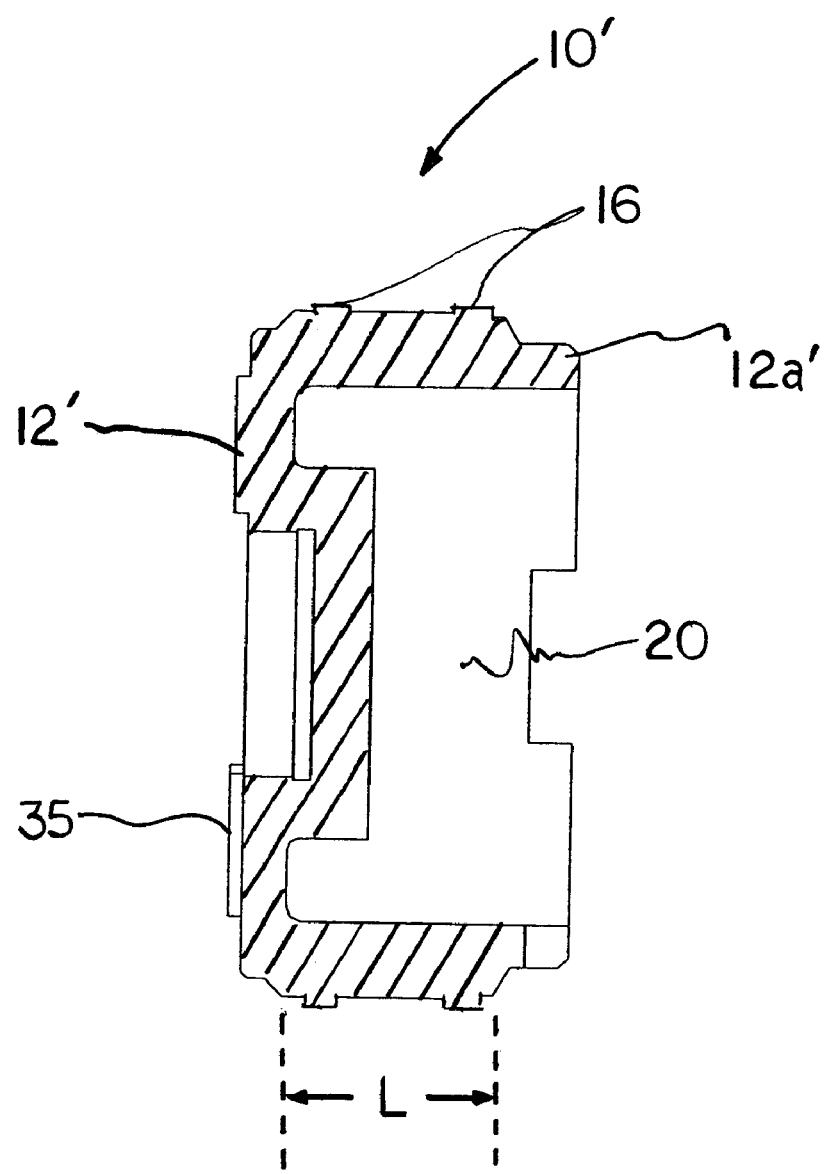
FIG. 5C is a cross-sectional view of an alternative embodiment of the present accumulator piston.

In an alternative construction the accumulator piston 10' is provided with a plurality of raised, circumferential guide ridges 16 integrally formed with the skirt portion 12a' of the body member 12' in lieu of seals 15 or guide rings 18 as shown in FIG. 5C. In this embodiment ridges 16 function to guide the reciprocating, axial movement of the piston 10' within the piston bore 105 in the valve body 110 and/or the transmission case in the absence of the accumulator pins 106, 147. Ridges 16 may be provided with a coating such as Teflon or other solid lubricant coating suitable for this application. In an alternative embodiment the piston 10' including guide ridges 16 may be provided with a hard anodize coating if aluminum is used to fabricate the piston 10' to reduce surface friction and increase service longevity.

In yet another alternative embodiment at least one ridge 16 may be utilized in combination with at least one seal ring 15. Of course, more than one of either ridges 16 and/or seals 15 and guide rings 18 may be utilized in combination with the other to achieve a desired configuration.

Figure 6:
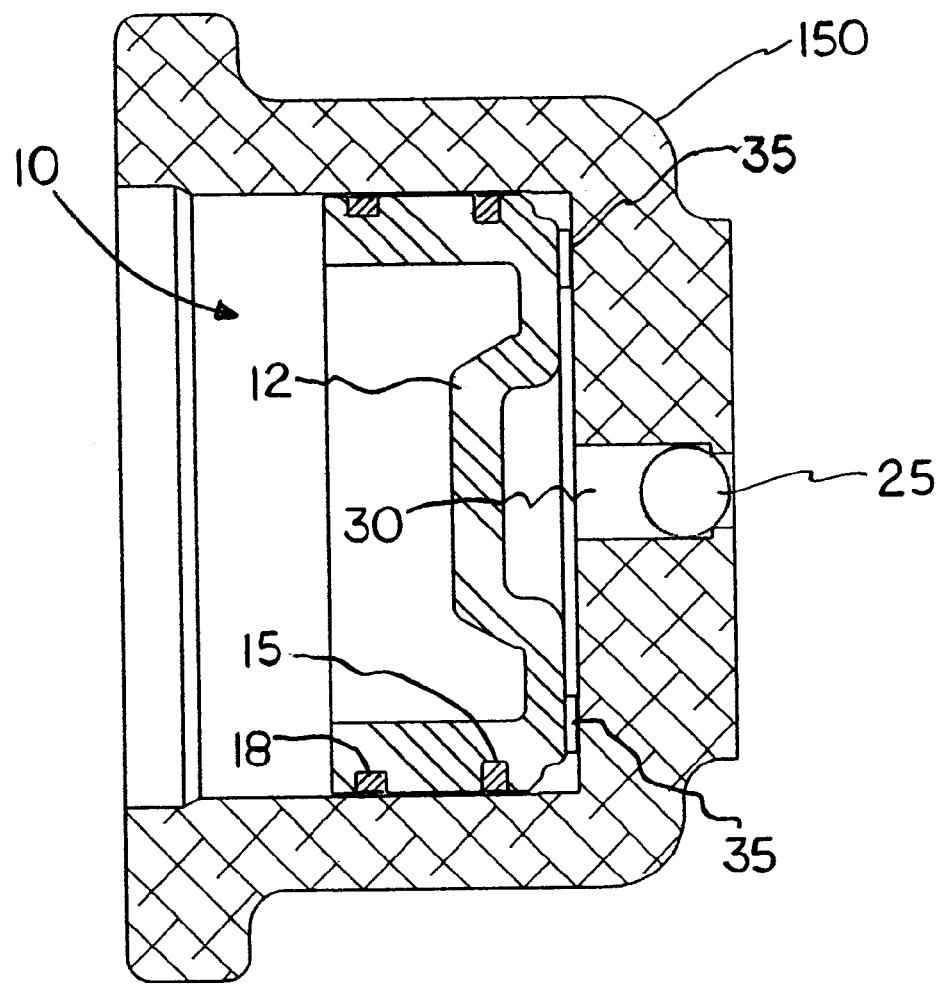
FIG. 6 is a cross-sectional view of the present accumulator piston installed within the cover of the 1–2 accumulator.

To retrofit the present accumulator pistons 10, 10' respectively into the OEM valve body 110, the covers 112, 150 are initially removed and the OEM accumulator assemblies 100, 135, or 140 are disassembled. Next, the OEM pistons 102 and seals 104 are discarded. Thereafter, the accumulator pins 106, 147 are removed from the valve body 110, the cover 150, and/or the transmission case respectively. Next, the resulting hole 30 in the valve body 110, the cover 150, or the transmission case wherein the pins 106, 147 were previously located are blocked using a ball bearing 25 or other suitable plug, which is pressed into the open hole using a sealant as at 30 (FIG. 6). If necessary, the ball bearing is retained in hole 30 (FIG. 6) by a staking process. Thereafter, a piston 10, 10' of the present pinless type is inserted into the bore 151 of the cover 150 (FIG. 6) as shown or, in the alternative, into the piston bore 105 within the valve body 110 (FIG. 1) or within the transmission case as described hereinabove.

It will be noted that the present accumulator pistons 10, 10' are provided with a plurality of integrally formed protuberances or feet 35 (FIG. 6) positioned at the leading end face 12c thereof, which function to maximize exposure of the leading end face 12c to ATF entering the accumulator assembly 10 and also to limit the travel of the piston 12 within the bore 105 during operation.

In the preferred embodiment the pinless accumulator piston 10 is fabricated from ASTM 6061-T6 aluminum, steel bar stock or other material such as engineering grade resins (i.e. phenolic resin) having suitable physical and mechanical properties for this application.

Although not specifically illustrated in the drawings, it should be understood that additional equipment and structural components will be provided as necessary and that all of the components described above are arranged and supported in an appropriate fashion to form a complete and operative pinless accumulator piston and method of its use incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A clutch accumulator assembly for replacement of an original equipment clutch accumulator assembly of an automatic transmission, wherein the original equipment clutch accumulator assembly comprises an accumulator piston having a cylindrical sidewall being disposed in a mating bore within a valve body of the transmission, an accumulator pin extending through a central bore in the accumulator piston and defining a pin/piston interface, said pin being secured within a hole in the valve body located along the center axis of said mating bore, a seal ring radially disposed about the accumulator piston, a compression spring disposed within the piston, and an accumulator cover securing the clutch accumulator assembly within the valve body of the transmission, said clutch accumulator assembly comprising:

a modified accumulator piston having a solid radial web structure wherein the the pin/piston interface is eliminated;

piston sealing means installed on said modified accumulator piston for sealing said accumulator piston within its mating bore;

piston guiding means installed on said modified accumulator piston for guiding the reciprocating movement of said modified accumulator piston during operation;

a compression spring disposed in coaxial relation to said accumulator piston; and plugging means for insertion within the hole in the mating bore in substitution of said accumulator pin.

2. The clutch accumulator assembly of claim 1 wherein said modified accumulator piston includes a cylindrical sidewall having an increased axial length in comparison to the original equipment accumulator piston, wherein said increased axial length is less than the outside diameter of said cylindrical sidewall and within the dimensional limits of the mating bore.

3. The clutch accumulator assembly of claim 2 wherein said guiding means includes at least one guide ring disposed in at least one circumferential groove formed about said accumulator piston.

4. The clutch accumulator assembly of claim 2 wherein said guiding means includes at least one guide ridge integrally formed with said sidewall about the circumference thereof.

5. The clutch accumulator assembly of claim 4 wherein a solid lubricant coating) is applied to said at least one guide ridge.

6. The clutch accumulator assembly of claim 1 wherein said plugging means includes a ball bearing conforming to the diameter of the hole in said mating bore, said ball bearing being inserted into the hole and permanently captured therein.

7. A method of preventing hydraulic leakage from an original equipment clutch accumulator assembly in an automatic transmission comprising an accumulator piston having a cylindrical sidewall, an accumulator pin extending through a central bore in the accumulator piston and defining a pin/piston interface, a seal ring radially disposed about the accumulator piston, a compression spring disposed within the piston, and an accumulator cover securing the clutch accumulator assembly within a valve body of the transmission, said method comprising the steps of:

providing a replacement accumulator piston wherein the accumulator pin and the pin/piston interface is eliminated;

removing the original equipment clutch accumulator assembly including said accumulator pin from its mating bore in the valve body;

blocking the accumulator pin hole in the valve body wherein the accumulator pin resided prior to removal thereof; and positioning said replacement accumulator piston within its mating bore in the valve body.

8. The method of claim 7 wherein the step of providing further includes the steps of:

fabricating a replacement accumulator piston having a modified cylindrical sidewall wherein the axial length thereof is increased in comparison to the original equipment accumulator piston; and installing piston guiding means on said modified cylindrical sidewall to guide the reciprocating movement of said piston during operation.

9. The method of claim 8 wherein the step of installing further includes the steps of:

positioning at least one guide ring within at least one mating groove formed about the circumference of said modified cylindrical sidewall.

10. The method of claim 7 wherein the step of blocking is carried out by a ball bearing inserted into the accumulator pin hole and permanently captured therein.

11. An improved clutch accumulator assembly for replacement of an original equipment clutch accumulator assembly of an automatic transmission, wherein the original equipment clutch accumulator assembly comprises an accumulator piston having a cylindrical sidewall being disposed in a mating bore within a valve body of the transmission, an accumulator pin extending through a central bore in the accumulator piston and defining a pin/piston interface, said pin being secured within a hole in the valve body located along the center axis of the mating bore, a seal ring radially disposed about the accumulator piston, a compression spring disposed within the piston, and an accumulator cover securing the clutch accumulator assembly within the valve body of the transmission, wherein the improvement comprises:

a modified accumulator piston having a solid radial web structure such that the the pin/piston interface is eliminated; and plugging means for installation within the hole in the mating bore in substitution of said accumulator pin.

12. The improved clutch accumulator assembly of claim 11 wherein said modified accumulator piston further includes a cylindrical sidewall having an increased axial length in comparison to the original equipment accumulator piston, wherein said increased axial length is less than the outside diameter of said cylindrical sidewall and within the dimensional limits of the mating bore.

13. The improved clutch accumulator assembly of claim 12 wherein said modified accumulator piston includes guiding means installed thereon for guiding the reciprocating movement of said modified accumulator piston within the mating bore during operation.

14. The replacement clutch accumulator assembly of claim 13 wherein said guiding means includes at least one guide ring disposed in at least one circumferential groove formed about said modified accumulator piston.

15. The replacement clutch accumulator assembly of claim 13 wherein said piston guiding means includes at least one guide ridge integrally formed with said sidewall about the circumference thereof.

16. The replacement clutch accumulator assembly of claim 15 wherein a solid lubricant coating is applied to said piston including said at least one guide ridge to reduce surface friction.

17. The replacement clutch accumulator assembly of claim 15 wherein a hard anodize coating is applied to said piston including said at least one guide ridge to reduce surface friction.

18. The replacement clutch accumulator assembly of claim 11 wherein said plugging means includes a ball bearing conforming to the diameter of the hole in said mating bore, said ball bearing being inserted into the hole and permanently captured therein.

* * * * *